(12) United States Patent
Bal et al.

(10) Patent No.: US 10,261,539 B2
(45) Date of Patent: Apr. 16, 2019

(54) SEPARATE CLOCK SYNCHRONOUS ARCHITECTURE

(71) Applicant: Integrated Device Technology, Inc., San Jose, CA (US)

(72) Inventors: Jagdeep Bal, Saratoga, CA (US); Ron Wade, Los Gatos, CA (US)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 113 days.

(21) Appl. No.: 15/475,328

(22) Filed: Mar. 31, 2017

(65) Prior Publication Data

US 2018/0284835 A1    Oct. 4, 2018

(51) Int. Cl.
| G06F 13/38 | (2006.01) |
| G06F 1/06 | (2006.01) |
| G06F 1/12 | (2006.01) |
| G06F 1/08 | (2006.01) |
| G06F 13/42 | (2006.01) |

(52) U.S. Cl.
CPC ............. *G06F 1/12* (2013.01); *G06F 1/08* (2013.01); *G06F 13/4291* (2013.01)

(58) Field of Classification Search
CPC .............. G06F 13/38; G06F 1/06; G06F 1/12
See application file for complete search history.

(56) References Cited

U.S. PATENT DOCUMENTS

| 7,539,889 | B2* | 5/2009 | Celinski | G06F 1/12 713/400 |
| 2004/0148404 | A1* | 7/2004 | Muroya | H04L 12/2801 709/228 |
| 2007/0055904 | A1* | 3/2007 | Conley | G06F 1/04 713/500 |
| 2007/0226530 | A1* | 9/2007 | Celinski | G06F 1/12 713/500 |
| 2009/0154121 | A1* | 6/2009 | Lee | H05K 1/0243 361/761 |
| 2014/0056286 | A1* | 2/2014 | Nagata | H04W 74/0808 370/336 |
| 2017/0289959 | A1* | 10/2017 | Aki | H04L 12/403 |

* cited by examiner

*Primary Examiner* — David E Martinez
(74) *Attorney, Agent, or Firm* — Christopher P. Maiorana, PC

(57) ABSTRACT

An apparatus includes a plurality of independently clocked devices and a low frequency beacon. Each of the plurality of independently clocked devices has a respective local clock generator. The low frequency beacon communicates a low frequency synchronization signal to each of the independently clocked devices. The respective local clock generators of the plurality of independently clocked devices are generally synchronized using the low frequency synchronization signal.

20 Claims, 7 Drawing Sheets

SEPARATE CLOCK SYNCHRONOUS ARCHITECTURE

FIELD OF THE INVENTION

The invention relates to serial communication systems generally and, more particularly, to a method and/or apparatus for implementing a separate clock synchronous architecture.

BACKGROUND

Many existing systems use a Peripheral Component Interconnect Express (PCIe or PCI-E) common clock architecture (CCA). PCIe is a serial bus standard for connecting a computer to one or more peripheral devices. Careful attention must be applied to control the clock skew at each point in the system. Conventional PCIe systems include constraints on connector pins, constraints on routing lengths, zero delay buffer (ZDB) constraints, especially with spread spectrum clocking (SSC), and transport delay constraints. The expense of distributing high frequency signals in a synchronous manner using conventional techniques is a barrier to building relatively large systems.

It would be desirable to implement a separate clock synchronous architecture.

SUMMARY

The invention concerns an apparatus including a plurality of independently clocked devices and a low frequency beacon. Each of the plurality of independently clocked devices has a respective local clock generator. The low frequency beacon communicates a low frequency synchronization signal to each of the independently clocked devices. The respective local clock generators of the plurality of independently clocked devices are generally synchronized using the low frequency synchronization signal.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing a separate clock synchronous architecture that may (i) distribute a low frequency (e.g., KHz) synchronization signal (or beacon or clock) throughout a system, (ii) distribute the synchronization signal wirelessly, (iii) be implemented in a PCIe application, (iv) be implemented in any serial communication system, (v) be implemented in any synchronously operated system having separate independently clocked modules or devices, (vi) allow a plurality of receiving devices to phase lock to an incoming synchronization signal, (vii) allow a plurality of receiving devices to synchronize modulation of spread spectrum clocks to an incoming synchronization signal, (viii) greatly ease system design and clock routing, (ix) allow local jitter to be determined by local clock device, (x) eliminate high speed clock routing issues that occur in the common clocking architecture, (xi) eliminate issues related to power involved in routing, buffering and controlling skew of a high speed clock (~100 MHz), and/or (xii) be implemented as one or more integrated circuits.

In various embodiments, a Peripheral Component Interconnect Express (PCIe or PCI-E) clocking scheme is described. However, the clocking scheme described herein is not limited to PCIe applications, but may be applied to any system comprising a plurality of separate independently clocked modules, devices, or circuits that need to be synchronized (e.g., a serial communication system, a storage area network (SAN), etc.). In various embodiments, the clocking scheme in accordance with embodiments of the invention provides increased determinism and higher performance. In various embodiments, a low frequency beacon (or synchronization signal) is provided that allows much easier synchronization of high frequency clock sources that are separated widely in space. The clocking scheme in accordance with embodiments of the invention generally allows the building of relatively large systems that operate synchronously rather than asynchronously. In various embodiments, rather than distributing and skew controlling a high frequency clock, a low speed (frequency) synchronization signal (clock) is distributed and the high frequency clocks are localized.

Figure 1:
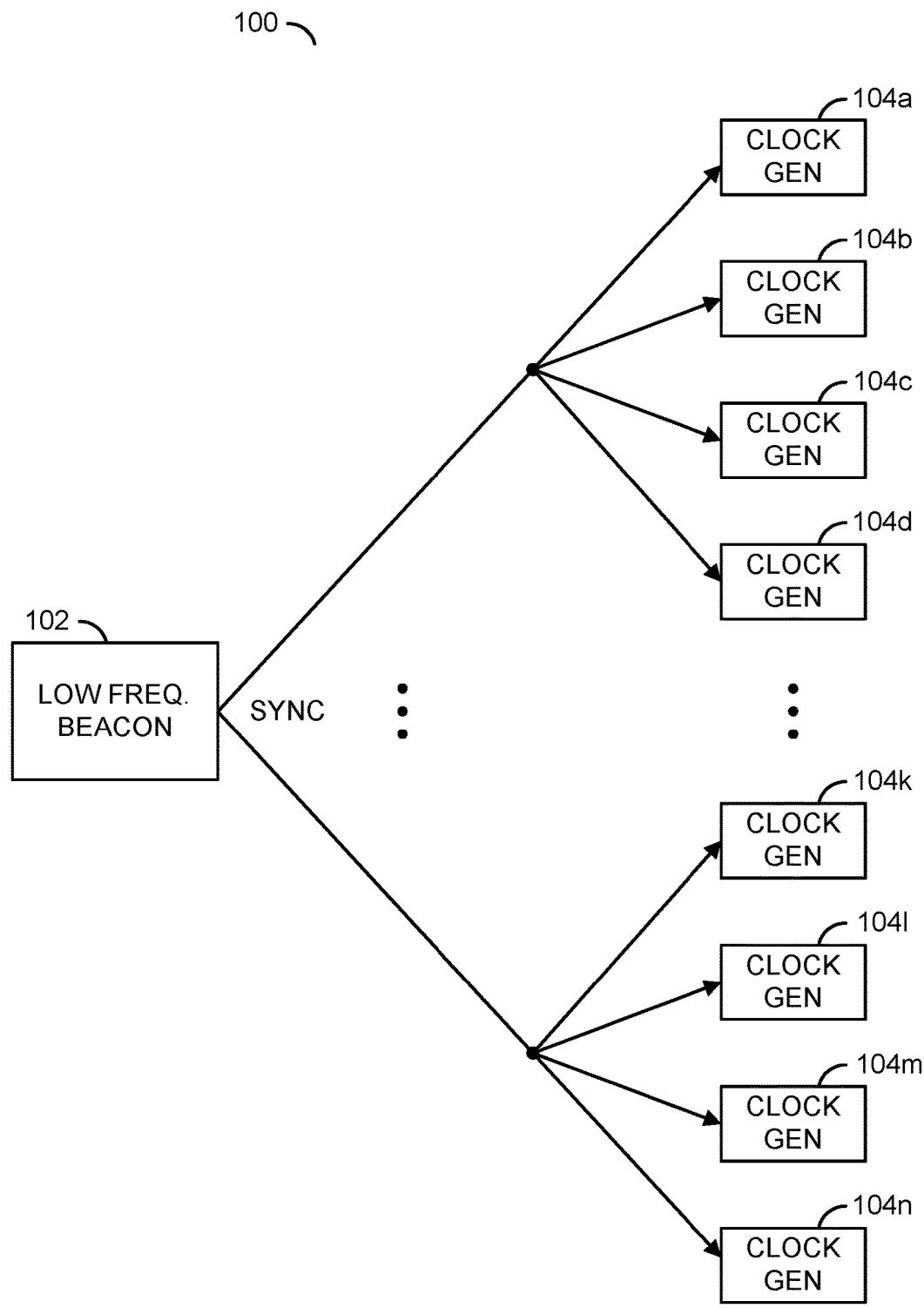
FIG. 1 is a diagram illustrating a separate clock synchronous architecture in accordance with an example embodiment of the invention.

Referring to FIG. 1, a diagram of a system 100 is shown illustrating a separate clock synchronous architecture (SCSA) in accordance with an example embodiment of the invention. In various embodiments, the system 100 comprises a beacon (or clock) device 102 configured to distribute a low frequency (e.g., KHz) synchronization signal (e.g., SYNC) to a plurality of independent clock generators 104a-104n. In an example, the signal SYNC may be generated as a 32 KHz signal.

Each of the clock generators 104a-104n is generally configured to generate a local reference clock for an associated device (not shown). The devices and the associated clock generators 104a-104n may be widely separated in space. In some embodiments, the low frequency synchronization signal SYNC may be generated from a master clock generator on one of the devices acting as the beacon device 102. In some embodiments, the synchronization signal SYNC may be distributed wirelessly by the beacon device 102 to the clock generators 104a-104n, easing system design and clock routing.

In various embodiments, the receiving (or slave) clock generators 104a-104n are generally configured to phase lock the locally generated reference clock to the incoming synchronization signal SYNC from the beacon device 102. Jitter content in the synchronization signal SYNC from the beacon device 102 generally does not significantly affect system operation. In general, local jitter is determined by the clock generators 104a-104n. The separate clock synchronous architecture (SCSA) in accordance with an example embodiment of the invention generally eases system design and clock routing. Embodiments of the invention may also support Spread Spectrum Clocking (SSC). In some embodiments, a clocking scheme in accordance with an example embodiment of the invention may be implemented as part of a Separate Reference Independent SSC Architecture (SRIS). High speed clock routing issues that occur in the common clocking architecture (CCA) are generally eliminated in a system implemented in accordance with embodiments of the invention. Issues related to the power involved in routing, buffering and controlling the skew of a high speed (~100 MHz) clock are generally eliminated as well.

Figure 2:
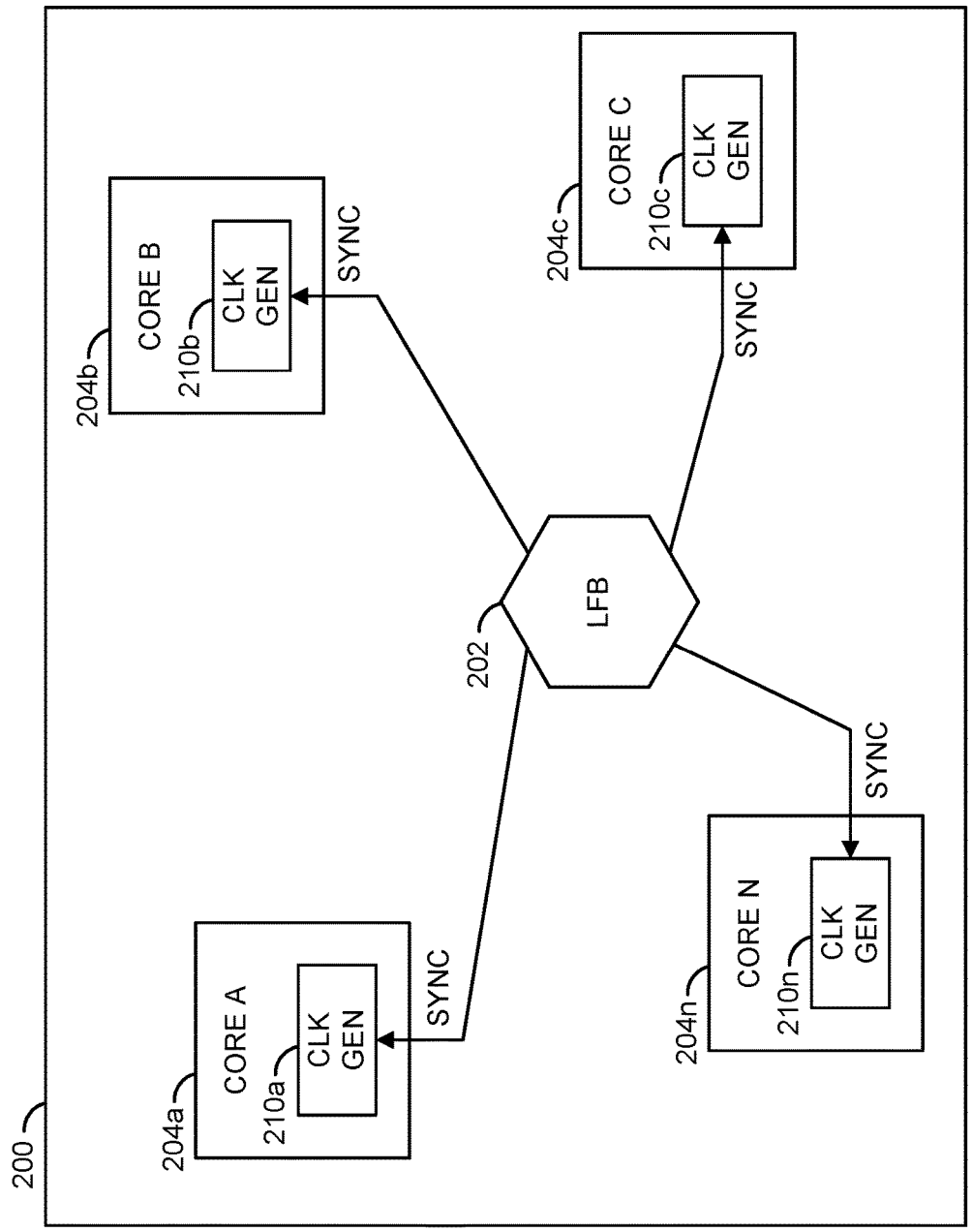
FIG. 2 is a diagram illustrating a multi-chip module in accordance with an example embodiment of the invention.

Referring to FIG. 2, a diagram of a system 200 is shown illustrating a design in accordance with an example embodiment of the invention. In an example, the system 200 may be implemented as a system on chip (SoC) or a multi-chip module (MCM). In another example, the system 200 may be implemented as a number of widely spaced independently clocked modules or devices. In various embodiments, the system 200 may comprise a low frequency beacon (LFB) 202 and a plurality of cores (or modules or devices) 204a-204n. The low frequency beacon (LFB) 202 is generally configured to generate a low speed (frequency) synchronization signal (e.g., SYNC). In an example, the low speed (frequency) synchronization signal SYNC may be distributed point-to-point to each of the cores (or modules or devices) 204a-204n.

In various embodiments, each of the devices 204a-204n generally comprise a local clock generator 210a-210n, respectively. The local clock generators 210a-210n are generally configured to independently generate a high speed (frequency) clock for the corresponding devices 204a-204n. The local clock generators 210a-210n are further configured to synchronize (e.g., phase lock) the high speed (frequency) clocks to the synchronization signal SYNC received from the low frequency beacon 202. In embodiments where the devices 204a-204n are further configured to use spread spectrum clocking (SSC), the local clock generators 210a-210n may be further configured to also control modulation of the spread clocks based upon the synchronization signal SYNC received from the low frequency beacon 202.

Figure 3:
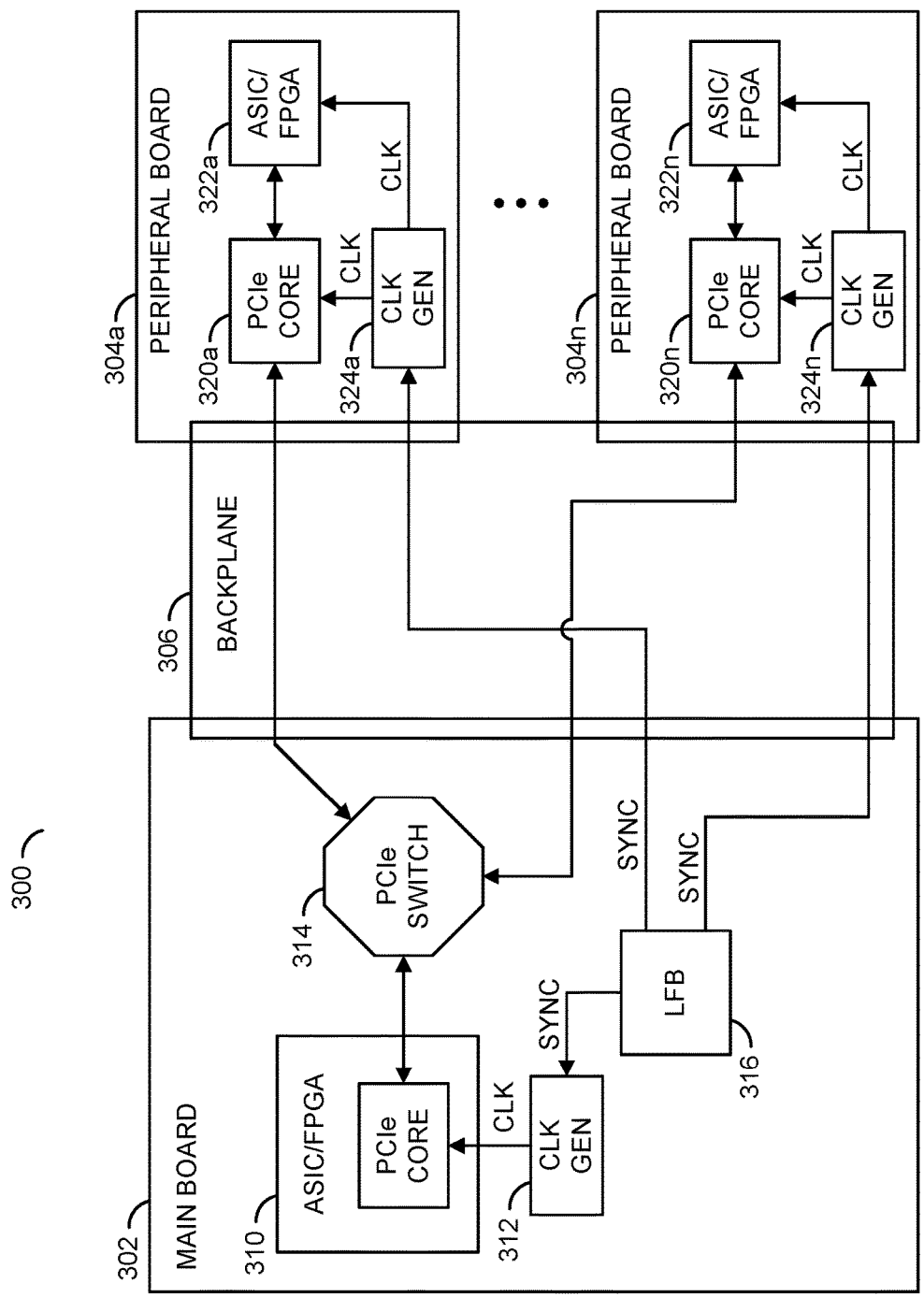
FIG. 3 is a diagram illustrating a PCIE system in accordance with an example embodiment of the invention.

Referring to FIG. 3, a diagram of a system 300 is shown illustrating a Peripheral Component Interconnect Express (PCIe or PCI-E) serial protocol based system using a separate clock architecture. In an example, the system 300 may comprise a mainboard (or motherboard) 302 and a number of peripheral devices (or cards) 304a-304n. The mainboard 302 and the peripheral devices 304a-304n may be connected via a backplane 306. However, other point-to-point connections (e.g., cables, etc.) may be implemented accordingly to meet the design criteria of a particular implementation. In an example, the mainboard 302 and the peripheral devices 304a-304n may be configured to communicate over PCIe links.

PCIe is a serial expansion bus standard for connecting a plurality of system components. PCIe provides lower latency and higher data transfer rates than parallel busses such as PCI and PCI-X. Every device that is connected to a motherboard or backplane with a PCIe link has a unique dedicated point-to-point connection. The devices are not competing for bandwidth because the devices are not sharing the same bus. Peripheral devices that use PCIe for data transfer include, but are not limited to graphics adapter cards (e.g., GPUs), network interface cards (e.g., NICs), storage accelerator devices and other high-performance peripherals.

A PCIe device transfers data over one or more sets of two signal pairs: two wires for transmitting and two wires for receiving. Each set of signal pairs is called a "lane," and each lane is capable of sending and receiving eight-bit data packets simultaneously between two points. The PCIe interface may be scaled from one to 32 separate lanes. In various embodiments, a PCIe interface is typically deployed with 1, 4, 8, 12, 16 or 32 lanes. The lane count of a PCIe card is a determining factor in the performance of the card and, therefore, in the price of the card.

PCIe bus slots are typically backward compatible with other PCIe bus slots, allowing PCIe links that use fewer lanes to use the same interface as PCIe links that use more lanes. In an example, a PCIe card with 8 lanes may be plugged into a PCIe slot with 16 lanes. However, PCIe bus slots are generally not backwards compatible with connection interfaces for older bus standards.

In various embodiments, PCIe may be utilized to provide high-speed networking across server backplanes, and connect to Gigabit Ethernet, RAID and Infiniband networking technologies outside of the server rack. The PCIe bus may also be utilized to interconnect clustered computers using HyperTransport. Mini PCI-e cards may be used to connect wireless adaptors, solid state device storage and other performance boosters to laptops, notebooks, mobile devices, etc. External PCI Express (ePCIe) may be used to connect a motherboard to an external PCIe interface, allowing a higher number of PCIe ports.

In an example, the motherboard 302 may comprise a circuit (or chip) 310, a clock generator 312, a PCIe switch 314, and a low frequency beacon 316. In an example, the circuit 310 may be implemented as an application specific integrated circuit (ASIC), field programmable gate array (FPGA), or other type of customizable integrated circuit. The circuit 310 may be clocked by a high speed (frequency) clock generated by the clock generator 312. The circuit 310 may include a PCIe core that may connect the circuit 310 to the PCIe switch 314. The PCIe switch 314 may also connect to the peripheral boards 304a-304n across the backplane 306. The low frequency beacon 316 may be configured to generate a low speed (frequency) beacon signal (e.g., SYNC) that may be distributed to the clock generator 312 and to each of the peripheral boards 304a-304n across the backplane 306. In various embodiments, the clock generator 312 is generally configured to synchronize (e.g., phase lock) the locally generated high speed clock to the low speed beacon SYNC.

In various embodiments, each of the peripheral boards 304a-304n may comprise a PCIe core 320a-320n, an integrated circuit (IC) core (e.g., ASIC, FPGA, etc.) 322a-322n, and a clock generator 324a-34n. The PCIe cores 320a-320n may connect the IC cores 322a-322n to the PCIe switch 314 on the motherboard 302. The clock generators 324a-324n may be configured to generated high speed (frequency) clock signals that may be used to clock the PCIe cores 320a-320n and the IC cores 322a-322n. The clock generators 324a-324n may be configured to receive the low speed (frequency) beacon signal generated by the low frequency beacon 316 via the backplane 306. In various embodiments, the clock generators 324a-324n may be configured to synchronize (e.g., phase lock) the respective high speed clock signals to the low speed beacon. Although the system 300 is shown having the low frequency beacon 316 on the mainboard 302, the invention is not limited to locating the low frequency beacon on the mainboard. In an example, the low frequency beacon 316 may be implemented as a separate device and configured to broadcast (communicate) the synchronization signal SYNC across a backplane or via cables to a number of independently clocked devices including, but not limited to host cards, line cards, server blades and/or fabric cards.

Figure 4:
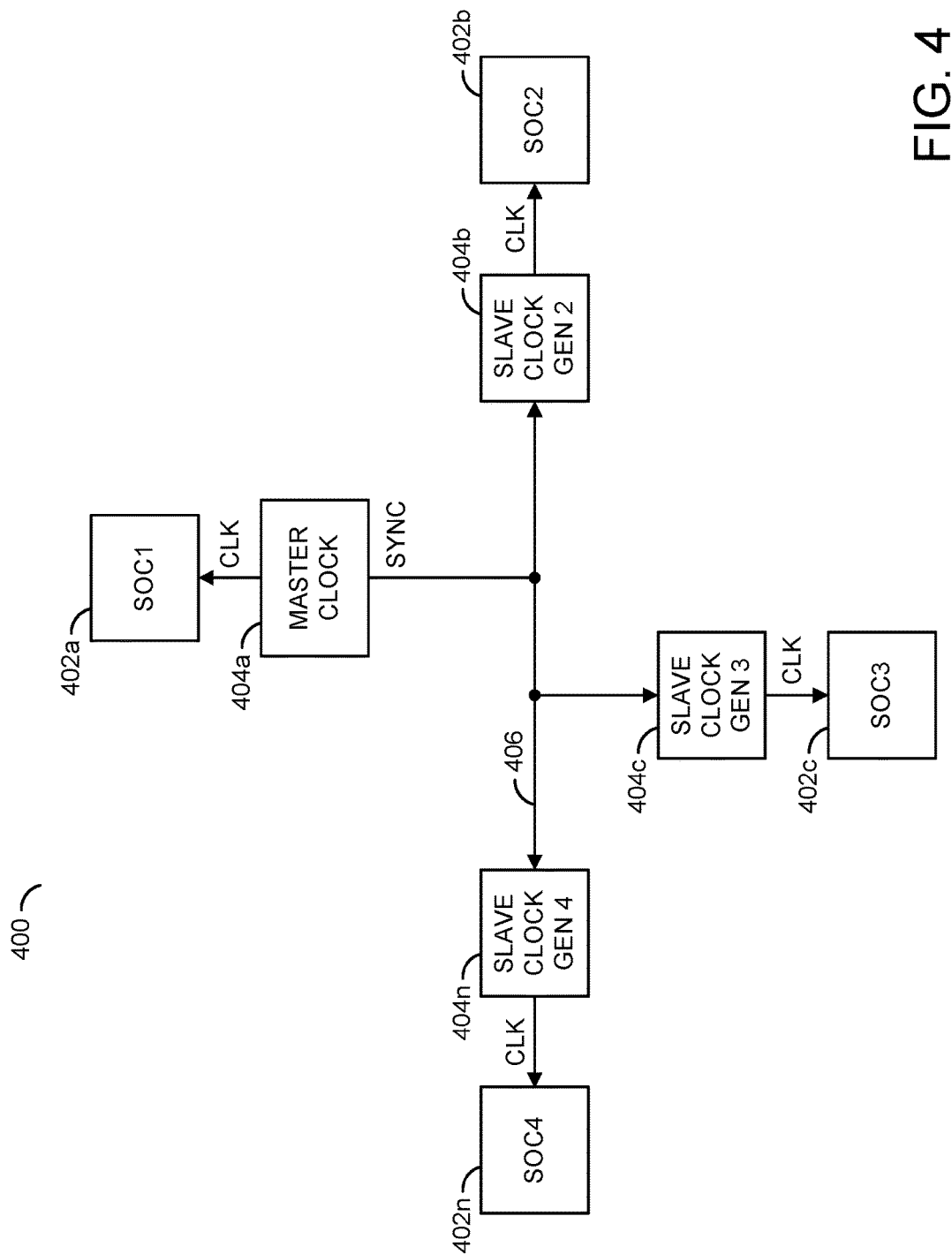
FIG. 4 is a diagram illustrating a system using master and slave clocks configured as a separate clock synchronous architecture.

Referring to FIG. 4, a diagram of a system 400 is shown illustrating a separate clock synchronous architecture in accordance with an example embodiment of the invention. In an example, the system 400 may comprise a plurality of system on chip (Soc) devices 402a-402n. The SoC devices 402a-402n may be separated in space (e.g., in different devices or pieces of equipment). Each of the SoC devices 402a-402n may be connected to a local clock generator 404a-404n. The local clock generators 404a-404n may be configured to generate high speed (frequency) clocks signals that be used to clock the SoC devices 402a-402n. In various embodiments, the plurality of local clock generators 404a-404n may be connected together by a communication link 406. The communication link 406 may be implemented either as a wired or a wireless link.

In various embodiments, one of the local clock generators (e.g., the local clock generator 404a) may be configured as a sourcing (or master) clock generator and the remainder of the local clock generators 404b-404n may be configured as receiving (or non-master or slave) clock generators. The master clock generator 404a may be further configured to generate the low speed (frequency) beacon signal (e.g., SYNC) for synchronizing the system 400. The low speed (frequency) beacon signal SYNC may be distributed to all the receiving clock generators 404b-404n via the communication link 406. In various embodiments, the receiving clock generators 404b-404n may be configured to synchronize (e.g., phase lock) the respective high speed (frequency) clock signals (e.g., CLK) using the low speed beacon signal SYNC received from the master clock generator 404a. In embodiments implementing a wireless communication link 406, the mater clock generator 404a and the receiving clock generators 404b-404n may comprise a wireless (e.g., radio frequency (RF), optical, sonic/ultrasonic, etc.) transmitter or receiver, respectively.

Figure 5:
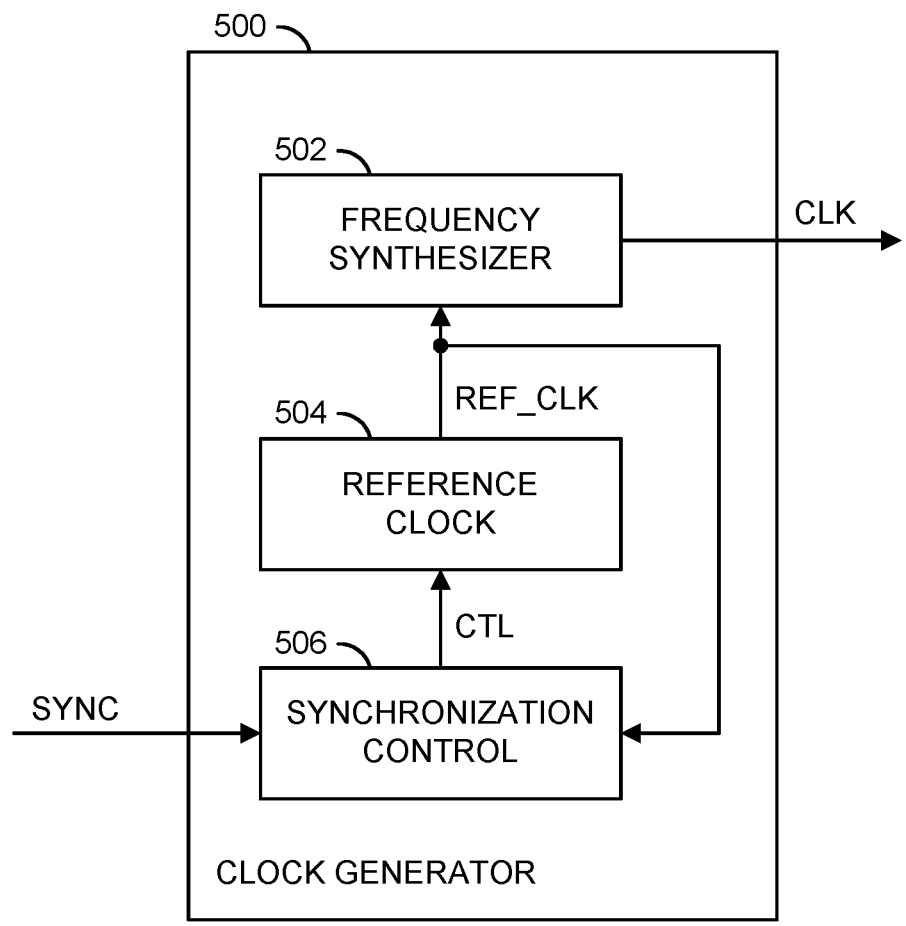
FIG. 5 is a diagram illustrating an example implementation of a local clock generating module in accordance with an example embodiment of the invention.

Referring to FIG. 5, a diagram of a circuit 500 is shown illustrating an example implementation of a clock generator in accordance with an example embodiment of the invention. In various embodiments, the circuit 500 may be used to implement the local clock generators 104a-104n, 210a-210n, 312, 324a-324n, and 404b-404n described above in connection with FIGS. 1-4. In various embodiments, the circuit 500 may be configured to generate a local high speed (frequency) clock signal (e.g., CLK). The circuit 500 may be further configured to synchronize the signal CLK with a low speed (frequency) clock (or beacon) signal (e.g., SYNC) received from a remote source.

In an example, the circuit 500 may comprise a block (or circuit) 502, a block (or circuit) 504, and a block (or circuit) 506. The circuit 502 may implement a frequency synthesizer. The circuit 504 may implement a reference clock generator. The circuit 506 may implement a synchronization control circuit. In various embodiments, the circuit 502 may be configured to generate the local high speed (frequency) clock signal CLK in response to a reference clock signal (e.g., REF_CLK) received from the circuit 504. The local high speed clock signal CLK may have a frequency that is a multiple of a frequency of the reference clock signal REF_CLK. In various embodiments, the circuit 502 may be implemented as a fractional N phase-locked loop or a digital phase-locked loop (DPLL).

In various embodiments, the reference clock generator 504 may be configured to generate the reference clock signal REF_CLK in response to a control signal CTL. A frequency and/or phase of the reference clock signal REF_CLK may be adjusted based upon the control signal CTL received from the circuit 506. In various embodiments, the control signal CTL may be implemented as either a digital signal (e.g., a number of bits) or an analog signal (e.g., a current or voltage level). In various embodiments, the reference clock generator 504 may be implemented using a voltage controlled crystal oscillator (VCXO), a digital phase-locked loop (DPLL), a delay locked loop (DLL), a surface acoustic wave (SAW) oscillator, a bulk acoustic wave (BAW) oscillator, a crystal oscillator, or a silicon oscillator. However, other types of oscillators may be implemented accordingly to meet the design criteria of a particular application.

In various embodiments, the circuit 506 may be configured to generate the control signal CTL based the reference clock signal REF_CLK, received from the reference clock generator 504, and the synchronization signal SYNC, received, for example, from a low speed (frequency) beacon. In various embodiments, the circuit 506 may be configured to generate the signal CTL based upon a phase and/or frequency comparison between the reference clock signal REF_CLK and the received low speed (frequency) synchronization signal or beacon SYNC. In embodiments implementing spread spectrum clocking (SSC), the circuit 506 may be further configured to control modulation of the spread clock based also on the received synchronization signal SYNC.

Figure 6:
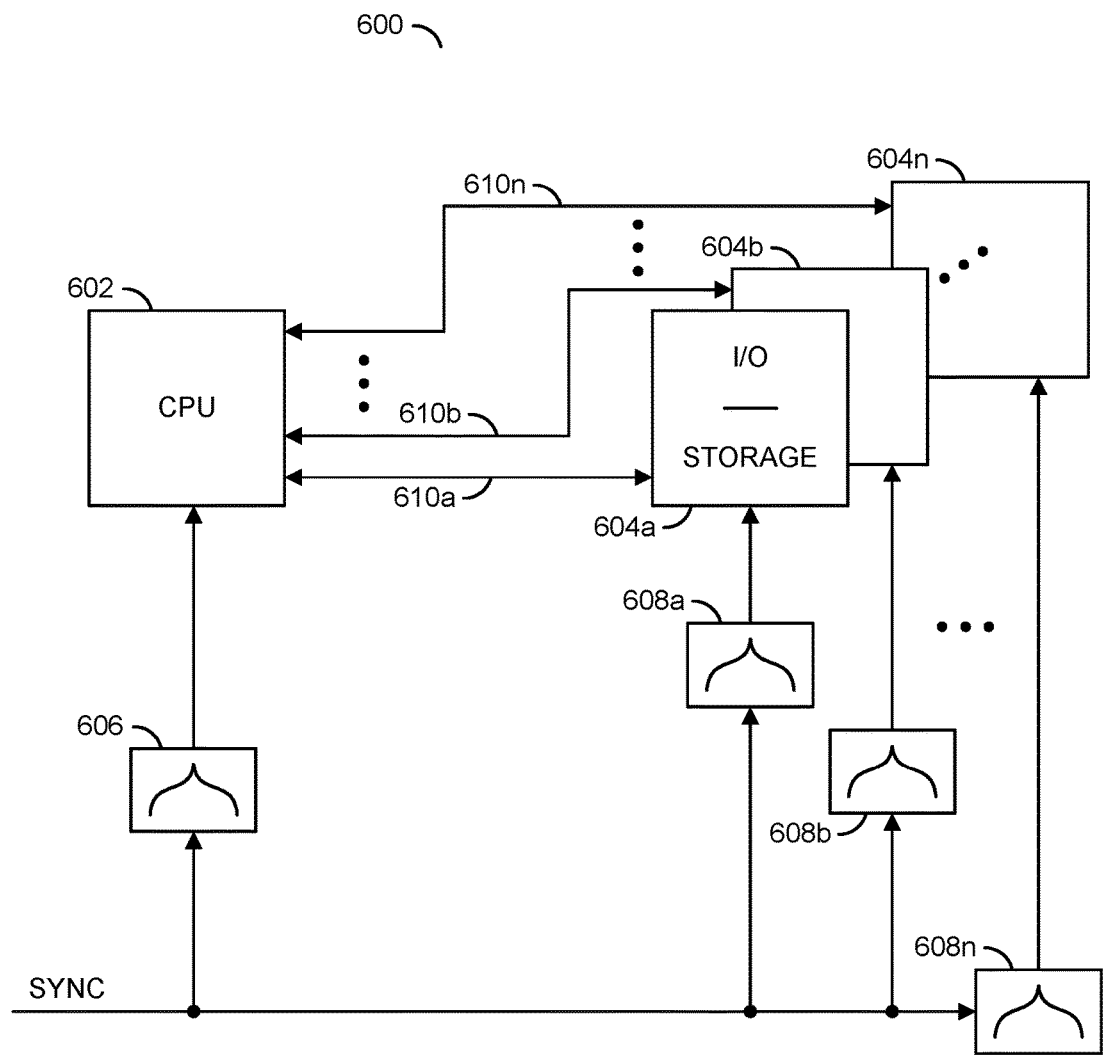
FIG. 6 is a diagram illustrating a separate reference independent spread spectrum clocking architecture (SRIS) in accordance with an example embodiment of the invention.

Referring to FIG. 6, a diagram of a system 600 is shown illustrating an example of a separate reference independent spread spectrum clocking architecture (SRIS) in accordance with an example embodiment of the invention. In an example, the system 600 may comprise a block (or circuit) 602, a number of blocks (or circuits) 604a-604n, a block (or circuit) 606, and a number of blocks (or circuits) 608a-608n. The block 602 may implement a processor (e.g., a central processing unit). The blocks 604a-604n may implement an input/output (I/O) and/or storage units. The block 606 may implement a spread spectrum clocking (SSC) reference clock generator. The blocks 608a-608n may implement spread spectrum clocking reference clock generators.

The block 602 may be coupled to the blocks 604a-604n via a number of serial links 610a-610n. In an example, the serial links 610a-610n may be implemented as PCIe links. The reference clock 606 may provide a reference clock signal to the block 602. The blocks 608a-608n may provide reference clock signals to the blocks 604a-604n. The blocks 606 and 608a-608n may receive a synchronization signal (e.g., SYNC). The blocks 606 and 608a-608n may be configured to synchronize the respective reference clocks using the signal SYNC. The blocks 606 and 608a-608n may be further configured to generate spread spectrum clocking signals. In embodiments implementing spread spectrum clocking, the blocks 606 and 608a-608n may be further configured to modulate the spread clocks based on the signal SYNC.

Figure 7:
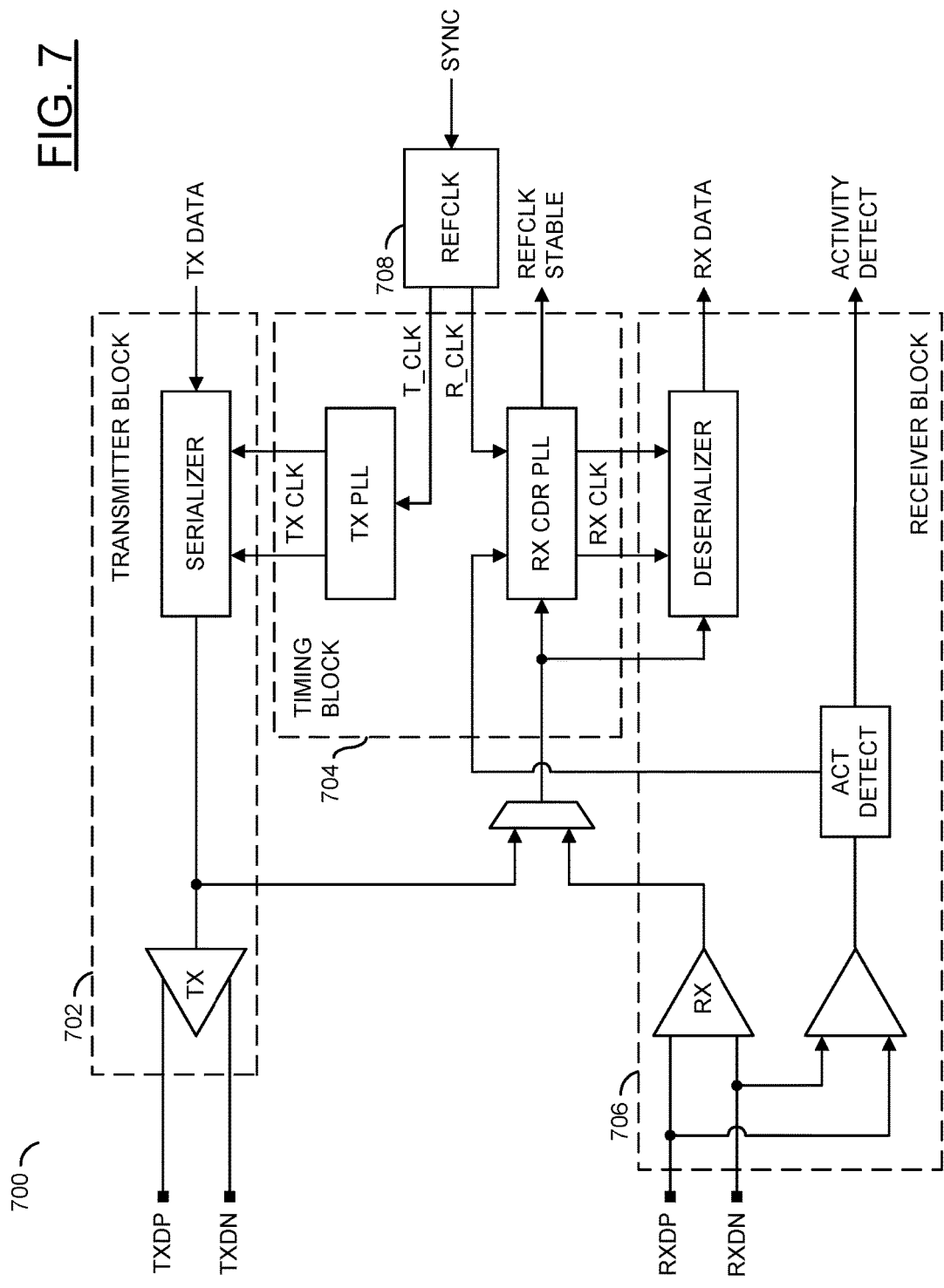
FIG. 7 is a diagram illustrating a serializer-deserializer circuit in accordance with an example embodiment of the invention.

Referring to FIG. 7, a diagram is shown illustrating an example serializer-deserializer circuit 700 in accordance with an embodiment of the invention. In general, the separate clock architecture avoids transmitting the clock to all channels by using separate clock sources at each PCIe endpoint. In embodiments implementing spread spectrum clocking, the clocking method generally supports two types of clocking: transmit and receive clocks having the same data rates and transmit and receive clocks operating at different data rates. When the transmitter and receiver are operating at different data rates, the system may tolerate a 5,600 ppm difference for separate reference clocks utilizing spread spectrum clocking. The effective jitter at the receiver is the Root Sum Square (RSS) sum of the transmitter and receiver phase-locked loops. Thus, the jitter requirement for separate reference clocks may be substantially tighter than for a common clock architecture. In embodiments implementing different data rates for transmitter and receiver, the reference clock generator may be configured to generate separate transmit reference and receiver reference clocks, and synchronize both the transmit reference clock and the receiver reference clock using the low frequency beacon signal SYNC received from the low frequency beacon.

In an example, the circuit 700 may be implemented as a serializer/deserializer (SERDES) circuit. In an example, the circuit 700 may comprise a block (or circuit) 702, a block (or circuit) 704, a block (or circuit) 706, and a block (or circuit) 708. The circuit 702 may implement a transmitter block. The block 704 may implement a timing block. The circuit 706 may implement a receiver block. The circuit 708 may implement a reference clock circuit in accordance with an embodiment of the present invention.

The circuit 702 may be configured to receive data to be transmitted using a PCIe link (e.g., TX DATA). The transmit data TX DATA may be serialized for transmission on the PCIe link using a transmit clock signal (e.g., TX CLK). The signal TX CLK may be generated by the timing block 704 in response to a transmitter reference clock (e.g., T_CLK). The circuit 704 may receive a serial stream from a PCIe link and deserialize the stream to recover receive data (e.g., RX DATA). The circuit 706 may deserialize the receive data using a receive clock (e.g., RX CLK) generated by the timing block 704. The timing block 704 may generate the receive clock RX CLK in response to a receive reference clock (e.g., R_CLK).

The block 708 may be configured to generate the transmit reference clock T_CLK and the receive reference clock R_CLK in response to the signal SYNC. In various embodiments, the circuit 708 may generate the transmit reference clock $T_{13}$ CLK and the receive reference clock R_CLK having different frequencies. The circuit 708 may be further configured to synchronized (e.g, phase lock) both the transmit reference clock and the receive reference clock to the system in general using the signal SYNC. The signal SYNC is generally received from a remote source or beacon.

Although embodiments of the invention have been described in the context of a PCIe application, the present invention is not limited to PCIe applications, but may also be applied in other high data rate serial communication applications where different transmission line effects, cross-coupling effects, traveling wave distortions, phase changes, impedance mismatches and/or line imbalances may exist. The present invention addresses concerns related to high speed communications, flexible clocking structures, specified command sets and lossy transmission lines. Future generations of serial communications standards can be expected to provide increasing speed, more flexibility, additional commands and different propagation characteristics. The present invention may also be applicable to memory systems implemented in compliance with either existing (legacy) memory specifications or future (e.g., DDR5) memory specifications.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
 a plurality of independently clocked devices, each having a respective local clock generator, wherein each of said respective local clock generators comprises (i) a reference clock generator configured to generate a local reference clock signal in response to a control signal and (ii) a synchronization control circuit configured to generate said control signal in response to said local reference clock signal and a low frequency synchronization signal; and
 a low frequency beacon, said low frequency beacon communicating said low frequency synchronization signal to each of said independently clocked devices, wherein said respective local clock generators of said plurality of independently clocked devices are synchronized using said low frequency synchronization signal.

2. The apparatus according to claim 1, wherein said low frequency synchronization signal is generated by one of said plurality of independently clocked devices configured as said low frequency beacon, and distributed to each of the other independently clocked devices.

3. The apparatus according to claim 2, wherein said low frequency synchronization signal is distributed wirelessly.

4. The apparatus according to claim 1, wherein each of said independently clocked devices is separated in space from the others.

5. The apparatus according to claim 1, wherein said low frequency beacon is located on a motherboard and each of said independently clocked devices is located on a peripheral board.

6. The apparatus according to claim 5, wherein each of said peripheral boards is connected to said motherboard by a backplane connector.

7. The apparatus according to claim 5, wherein each of said peripheral boards is connected to said motherboard by a serial communication bus.

8. The apparatus according to claim 5, wherein each of said peripheral boards is connected to said motherboard by a peripheral component interconnect express bus.

9. The apparatus according to claim 1, wherein each of said respective local clock generators is configured to generate a local high speed clock signal.

10. The apparatus according to claim 9, wherein each of said respective local clock generators further comprises:
 a frequency synthesizer configured to generate said local high speed clock signal.

11. The apparatus according to claim 1, wherein each of said respective local clock generators is configured to generate a local high speed spread spectrum clock signal.

12. The apparatus according to claim 11, wherein each of said respective local clock generators is configured to modulate a spread of said spread spectrum clock signal based on said low frequency synchronization signal.

13. A method of synchronizing a plurality of independently clocked devices comprising:
 configuring one of said plurality of independently clocked devices as a beacon device comprising a master clock and generating a low frequency synchronization signal using a respective clock generator of the beacon device;

distributing the low frequency synchronization signal to remaining ones of the plurality of independently clocked devices; and synchronizing respective clock generators of the remaining ones of the plurality of independently clocked devices with the beacon device using the low frequency synchronization signal, wherein each of the respective clock generators of the remaining ones of the plurality of independently clocked devices comprises (i) a reference clock generator configured to generate a local reference clock signal in response to a control signal and (ii) a synchronization control circuit configured to generate the control signal in response to the local reference clock signal and the low frequency synchronization signal.

14. The method according to claim 13, wherein said low frequency synchronization signal is distributed wirelessly.

15. The method according to claim 13, wherein each of said independently clocked devices is separated in space from the others.

16. A separate clock synchronous architecture comprising:

a low frequency beacon configured to generate a low frequency synchronization signal; and a distribution network configured to communicate said low frequency synchronization signal to a plurality of independently clocked devices, wherein (i) each of said plurality of independently clocked devices comprises a respective local clock generator and (ii) each of said respective local clock generators comprises a reference clock generator configured to generate a local reference clock signal in response to a control signal and a synchronization control circuit configured to generate said control signal in response to said local reference clock signal and said low frequency synchronization signal, such that said respective clock generators of said plurality of independently clocked devices are synchronized to one another using the low frequency synchronization signal.

17. The separate clock synchronous architecture according to claim 16, wherein said low frequency synchronization signal is distributed wirelessly.

18. The separate clock synchronous architecture according to claim 16, wherein each of said independently clocked devices is separated in space from the others.

19. The separate clock synchronous architecture according to claim 16, wherein each of said respective clock generators is configured to generate a local high speed spread spectrum clock signal.

20. The separate clock synchronous architecture according to claim 19, wherein each of said respective clock generators is configured to modulate a spread of said spread spectrum clock signal based on said low frequency synchronization signal.

* * * * *